US012095927B2

(12) United States Patent
Okano et al.

(10) Patent No.: US 12,095,927 B2
(45) Date of Patent: Sep. 17, 2024

(54) SIGNATURE VERIFICATION SYSTEM, VERIFICATION KEY MANAGEMENT APPARATUS, VERIFICATION KEY MANAGEMENT METHOD AND PROGRAM

(71) Applicant: NIPPON TELEGRAPH AND TELEPHONE CORPORATION, Tokyo (JP)

(72) Inventors: Yuki Okano, Tokyo (JP); Tetsuya Okuda, Tokyo (JP); Koha Kinjo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 329 days.

(21) Appl. No.: 17/611,067

(22) PCT Filed: May 21, 2019

(86) PCT No.: PCT/JP2019/020175
§ 371 (c)(1),
(2) Date: Nov. 12, 2021

(87) PCT Pub. No.: WO2020/235025
PCT Pub. Date: Nov. 26, 2020

(65) Prior Publication Data
US 2022/0247569 A1 Aug. 4, 2022

(51) Int. Cl.
*H04L 9/32* (2006.01)

(52) U.S. Cl.
CPC .................................. *H04L 9/3247* (2013.01)

(58) Field of Classification Search
CPC ....... H04L 9/50; H04L 9/3236; H04L 9/3247; H04L 63/0823; H04L 63/123; H04L 2209/56; G06F 21/42
See application file for complete search history.

(56) References Cited

U.S. PATENT DOCUMENTS

| | | | | |
|---|---|---|---|---|
| 9,875,347 B2 * | 1/2018 | Baghdasaryan | ...... | G06F 21/316 |
| 2008/0262970 A1 * | 10/2008 | Engelke | .............. | G06Q 20/382 713/168 |

(Continued)

OTHER PUBLICATIONS

IAB Tech Lab (2021) "OpenRTB Specification v3.0" [online] website: <URL: https://github.com/InteractiveAdvertisingBureau/openrtb/blob/master/OpenRTB%20v3.0%20FINAL.md>.

(Continued)

*Primary Examiner* — Abu S Sholeman

(57) ABSTRACT

A signature verification system includes a signature generation server, a signature verification server, and a verification key management server that are connected to one another via a communication network. The signature generation server includes: reporting means for, when a signing key and a verification key are generated by a publisher, reporting the verification key and publisher identification information that identifies the publisher to the verification key management server; and signature generation means for signing a bid request issued by the publisher with use of the signing key. The verification key management server includes: registration means for registering the publisher identification information and the verification key that were reported by the reporting means in a storage unit in association with information that enables specifying a version of the verification key.

6 Claims, 14 Drawing Sheets

(56) References Cited

U.S. PATENT DOCUMENTS

2017/0126408 A1* 5/2017 Van Someren ......... H04L 63/06
2019/0172057 A1* 6/2019 Vincent ................. H04L 9/0637

OTHER PUBLICATIONS

IAB Tech Lab (2018) "Ads.cert v1.0: Signed Bid Requests" [online] website: <URL: https://github.com/InteractiveAdvertisingBureau/openrtb/blob/master/ads.cert:%20Signed%20Bid%20Requests%201.0%20BETA.md>.
LaMacchia et al. (2007) "Stronger security of authenticated key exchange," International conference on provable security, Springer, Berlin, Heidelberg.
Yoneyama et al. (2018) "Exposure-Resilient Identity-Based Dynamic Multi-Cast Key Distribution," IEICE Transactions on Fundamentals of Electronics, Communications and Computer Sciences, 101(6), 929-944.

* cited by examiner

SIGNATURE VERIFICATION SYSTEM, VERIFICATION KEY MANAGEMENT APPARATUS, VERIFICATION KEY MANAGEMENT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/020175, filed on 21 May 2019, the disclosure of which is hereby incorporated herein by reference in its entirety.

TECHNICAL FIELD

The present invention relates to a signature verification system, a verification key management apparatus, a verification key management method, and a program.

BACKGROUND ART

In Internet advertising, a mechanism called real-time bidding (RTB) is known as a mechanism for maximizing both advertising revenue for a seller (publisher) who sells an ad space and advertising effectiveness for a buyer (e.g., an advertiser, an advertising agency, or the like) who submits advertisements.

In real-time bidding, there are multiple intermediary players for transactions (e.g., a DSP (Demand-Side Platform), an SSP (Supply-Side Platform), Ad Exchange, an Ad Network, or the like), and therefore there has been a problem in that malicious persons (unauthorized intermediaries) could intrude and commit advertising fraud (ad fraud) such as illegally inflating the advertising effectiveness. In order to address the problem described above, the IAB (Interactive Advertising Bureau), which defines specifications for a standard protocol for real-time bidding, has published a specification called Open RTB 3.0 (NPL 1). In this specification, ads.cert, which is a mechanism for authenticating advertising inventory using a digital signature, has been proposed as a countermeasure against ad fraud (NPL 2).

According to the ads.cert specification, the publisher, who is the seller, uses a signing key to sign a bid request that is to be issued. Upon receiving the bid request, the buyer (e.g., a DSP, Ad Exchange, or the like) obtains a file that has been given the same file name as a verification key file name included in the bid request from directly under the publisher's root domain, and performs signature verification using a verification key included in the file. Accordingly, the buyer can confirm that the content (e.g., inventory information, or the like) of the bid request issued by the publisher has not been tampered with, thus preventing the intrusion of unauthorized intermediaries.

CITATION LIST

Non-Patent Document

[NPD 1] IAB Tech Lab. "OpenRTB Specification v3.0".
[NPD 2] IAB Tech Lab. "Ads.cert v1.0: Signed Bid Requests".

SUMMARY OF THE INVENTION

Technical Problem

However, a problem is that the buyer could not determine whether the verification key included in the obtained file is a valid key that was generated by the publisher who issued the bid request (i.e., authenticity of the verification key is unknown). Key management is entrusted to the publisher in the ads.cert specification, and therefore if key revocation management is inadequate, bid requests can be spoofed with a compromised key.

In view of the point described above, embodiments of the present invention are provided and an object of the present invention is to verify a signature of a bid request using a verification key for which authenticity has been confirmed.

Means for Solving the Problem

In order to achieve the above-described object, a signature verification system according to an embodiment of the present invention is a signature verification system including a signature generation server, a signature verification server, and a verification key management server that are connected to each other via a communication network. The signature generation server includes: reporting means for, when a signing key and a verification key are generated by a publisher, reporting the verification key and publisher identification information that identifies the publisher to the verification key management server; and signature generation means for signing a bid request issued by the publisher with use of the signing key. The verification key management server includes: registration means for registering the publisher identification information and the verification key that were reported by the reporting means in a storage unit in association with information that enables specifying a version of the verification key; verification means for, upon receiving publisher identification information and a name indicating a verification key from the signature verification server, verifying whether or not a verification key that corresponds to the received publisher identification information and name and that is a latest version is registered in the storage unit; and first transmission means for, if the verification means verified that the verification key that is the latest version is registered in the storage unit, transmitting the latest-version verification key to the signature verification server. The signature verification server includes: second transmission means for, upon receiving the bid request, transmitting publisher identification information and a name indicating a verification key that are included in the bid request to the verification key management server; and signature verification means for, if the publisher identification information and the name were transmitted by the second transmission means and the latest-version verification key was received from the verification key management server in response, performing verification of the bid request with use of the latest-version verification key.

Effects of the Invention

A signature of a bid request can be verified using a verification key for which authenticity has been confirmed.

DESCRIPTION OF EMBODIMENTS

One or more embodiments (present embodiments) of the present invention will be described below. In the present embodiment, a signature verification system 1 that, when verifying the signature of a bid request in accordance with the ads.cert specification, can verify the signature with a verification key for which authenticity has been confirmed.

<Overall Configuration of Signature Verification System 1>

Figure 1:
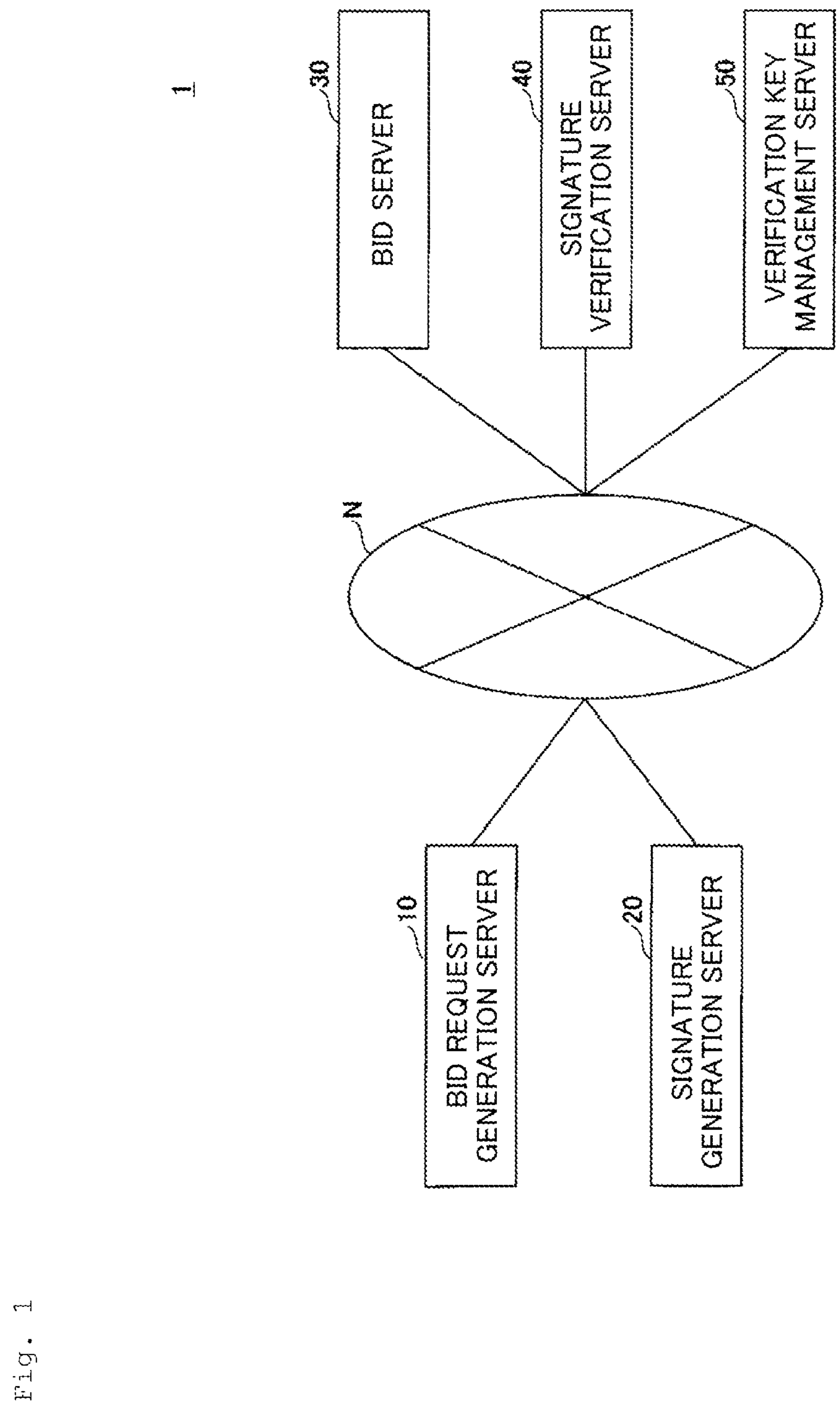
FIG. 1 is a diagram showing an example of the overall configuration of a signature verification system according to an embodiment.

FIG. 1 is a diagram showing an example of the overall configuration of the signature verification system 1 according to the present embodiment. As shown in FIG. 1, the signature verification system 1 according to the present embodiment includes a bid request generation server 10, a signature generation server 20, a bid server 30, a signature verification server 40, and a verification key management server 50. These servers are communicably connected to one another via a communication network N such as the Internet. Note that the bid request generation server 10 and the bid server 30 may communicate directly with each other, or may indirectly communicate with each other via an intermediate server such as an SSP described in Non-Patent Document 1.

The bid request generation server 10 corresponds to, for example, a publisher (or a request originator) described in Non-Patent Document 1. The bid request generation server 10 generates bid requests and transmits the bid requests that have been signed by the signature generation server 20.

The signature generation server 20 corresponds to a publisher, or a service provider to sign on behalf of the publisher. The signature generation server 20 receives a bid request from the bid request generation server 10 and signs the bid request.

Note that the bid request generation server 10 and the signature generation server 20 may be integrated. In the present embodiment, these servers will be described as separate servers.

The bid server 30 is implemented by Ad Exchange, a DSP, or the like. The bid server 30 receives bid requests from the bid request generation server 10.

The signature verification server 40 is implemented by, for example, the signature verifier described in Non-Patent Document 2, Ad Exchange, a DSP, or a service provider serving as a proxy for signature verification. The signature verification server 40 receives a bid request from the bid server 30 and verifies a given signature based on the bid request.

Note that the bid server 30 and the signature verification server 40 may be integrated with each other. In the present embodiment, these servers will be described as separate servers.

The verification key management server 50 manages a publisher's verification key (including expired verification keys). In other words, the verification key management server 50 manages generations of verification keys for each publisher.

In response to an inquiry from the signature verification server 40, the verification key management server 50 determines whether a verification key associated with the inquiry exists. If a verification key exists, the verification key management server 50 checks whether a version of the verification key is the latest. If a version of the verification key is the latest, the verification key management server 50 returns the verification key to the signature verification server 40. Accordingly, the signature verification server 40 can confirm that the verification key associated with a verification key file name included in the bid request is authentic, thereby enabling confirmation that the bid request has been generated by a given correct publisher. Note that a valid verification key is the latest verification key (or a verification key with a high probability of being the latest) issued by a valid publisher.

Here, as described above, the verification key management server 50 according to the present embodiment manages generations of verification keys for each publisher. In the present embodiment, a first example in which verification keys are collected by a first method shown below, as well as a second example in which verification keys are collected by a second method shown below, will be described.

A first method: when a publisher, or a service provider to sign on behalf of the publisher updates the signing key and verification key pair, the publisher or the service provider that performs signing on behalf of the publisher registers the verification key in the verification key management server 50.

A second method: when Ad Exchange, DSP, a signature verifier, or a service provider to provide a signature verification service, verifies a signature, a given verification key corresponding to a verification key file name included in the bid request is acquired by the verification key management server 50, and the verification key management server 50 manages generations of the acquired verification key for each publisher.

Note that in the second method, which differs from the first method, the verification key acquired by the verification key management server 50 is not necessarily the latest verification key. For this reason, when the second method is used, the verification key management server 50 manages the verification key that is considered to be the latest (has a high probability of being the latest) when observing the traffic flowing on the advertising platform, and this has an advantage of eliminating the need for registration to be performed by the publisher or the service provider who performs signing on behalf of the publisher.

First Example

Hereinafter, Example 1 will be described.

<Functional Configuration>

The functional configurations of the signature generation server 20, the signature verification server 40, and the verification key management server 50 in Example 1 will be described.

<<Signature Generation Server 20>>

Figure 2:
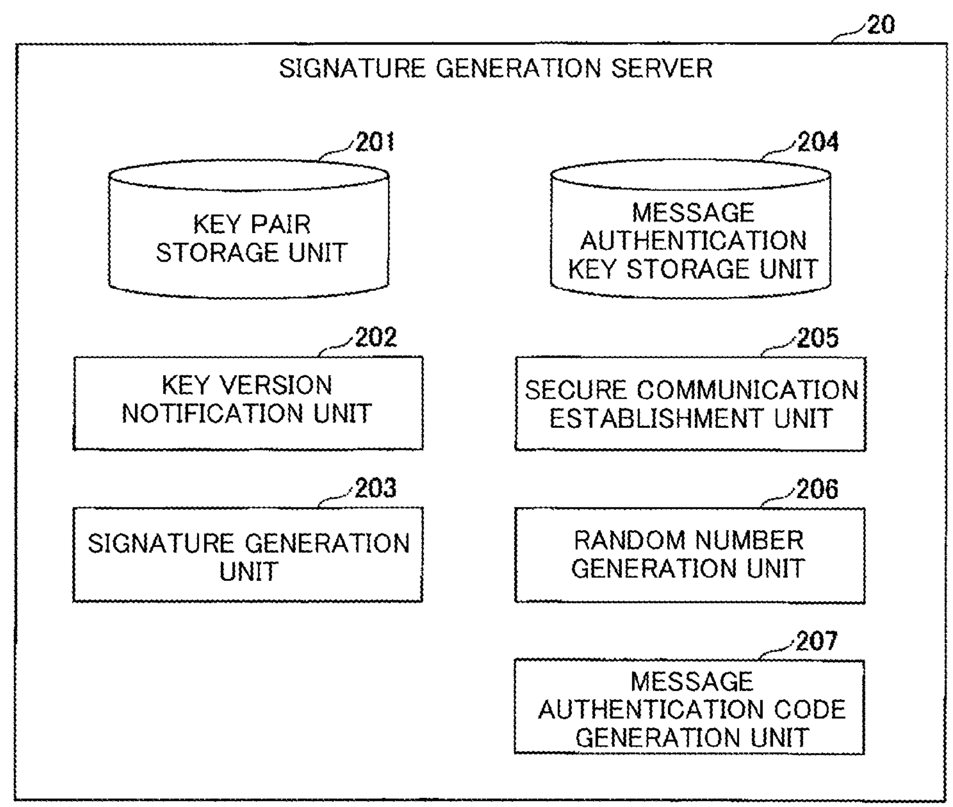
FIG. 2 is a diagram showing an example of the functional configuration of a signature generation server according to Example 1.

FIG. 2 is a diagram showing an example of the functional configuration of the signature generation server 20 in the Example 1. As shown in FIG. 2, the signature generation server 20 in Example 1 has a key pair storage unit 201, a key version notification unit 202, and a signature generation unit 203.

The key pair storage unit 201 stores a pair (key pair) of a signing key and a verification key for a corresponding publisher. Here, there are cases in which the signature generation server 20 might perform, as proxy, signature generation for a plurality of bid requests generated by a plurality of bid request generation servers 10. For this reason, the key pair storage unit 201 stores each key pair in association with an identifier for identifying a given publisher that manages the bid request generation server 10. In the present embodiment, a publisher domain name is used as the identifier for identifying a given publisher, but the present invention is not limited thereto. Any information can be used as an identifier, as long as the publisher can be identified. Note that key pairs may be generated by either the bid request generation server 10 or the signature generation server 20.

If a given key pair is first generated, or a key pair is regenerated after a predetermined time has elapsed, the key version notification unit 202 transmits the verification key to the verification key management server 50. Also, at this time, the key version notification unit 202 transmits a given publisher domain name of the publisher that has issued the verification key, to the verification key management server 50. Accordingly, the verification key is registered in the verification key management server 50. In this case, as in Non-Patent Document 1, for example, the verification key is published in a text format file called "ads-cert.version.txt" to which it is written. For this reason, it is preferable that the verification key is registered in the verification key management server 50 so as to be in the format of ads-cert.version.txt. In the following, a file in the ads-cert.version.txt format, including verification key information, is referred to as an "ads-cert file".

When the signature generation unit 203 receives a bid request from the bid request generation server 10, the signature generation unit 203 retrieves the signing key of a given publisher to manage the bid request generation server 10, from the key pair storage unit 201, and uses a given signing key to sign the bid request.

As described above, the signature generation server 20 transmits an ads-cert file (i.e., a verification key) to the verification key management server 50 to register the verification key. Thus, in order to prevent tampering of the verification key, it is preferable to establish a secure channel in advance between the signature generation server 20 and the verification key management server 50, and to register a given verification key using the secure channel. In view of the point described above, as shown in FIG. 2, the signature generation server 20 in the first example includes a message authentication key storage unit 204, a secure communication establishment unit 205, a random number generation unit 206, and a message authentication code generation unit 207. Note that it is considered to establish a secure channel each time communication is performed. However, from the viewpoint of efficiency, in the present embodiment, a case where a secure channel is established in advance will be described.

The message authentication key storage unit 204 stores a key $K_1$ that is shared with the verification key management server 50.

The secure communication establishment unit 205 executes a key sharing protocol with the verification key management server 50 to generate the key $K_1$, and stores the key $K_1$ in the message authentication key storage unit 204. Note that it is preferable that the secure communication establishment unit 205 regenerates the key $K_1$ every time a predetermined time elapses by re-executing the key sharing protocol with the verification key management server 50.

Note that the key sharing protocols described in References 1 and 2 below can be used, for example. However, the present invention is not limited to these examples, and any key sharing protocol can be used.

Reference 1

LaMacchia, Brian, Kristin Lauter, and Anton Mityagin. "Stronger security of authenticated key exchange." International conference on provable security. Springer, Berlin, Heidelberg, 2007.

Reference 2

YONEYAMA, K., YOSHIDA, R., KAWAHARA, Y., KOBAYASHI, T., FUJI, H., and YAMAMOTO, T. (2018). "Exposure-Resilient Identity-Based Dynamic Multi-Cast Key Distribution." IEICE TRANSACTIONS on Fundamentals of Electronics, Communications and Computer Sciences, 101(6), 929-944.

The random number generation unit 206 generates a random number r that is to be used for generating a message authentication code (MAC).

When sending an ads-cert file to the verification key management server 50, the message authentication code generation unit 207 uses the key $K_1$ to generate a message authentication code for a message that is obtained by combining the random number r, a given publisher domain name, and the ads-cert file. Note that by verifying the message authentication code, the verification key management server 50 can confirm whether the ads-cert file has been tampered with.

<<Signature Verification Server 40>>

Figure 3:
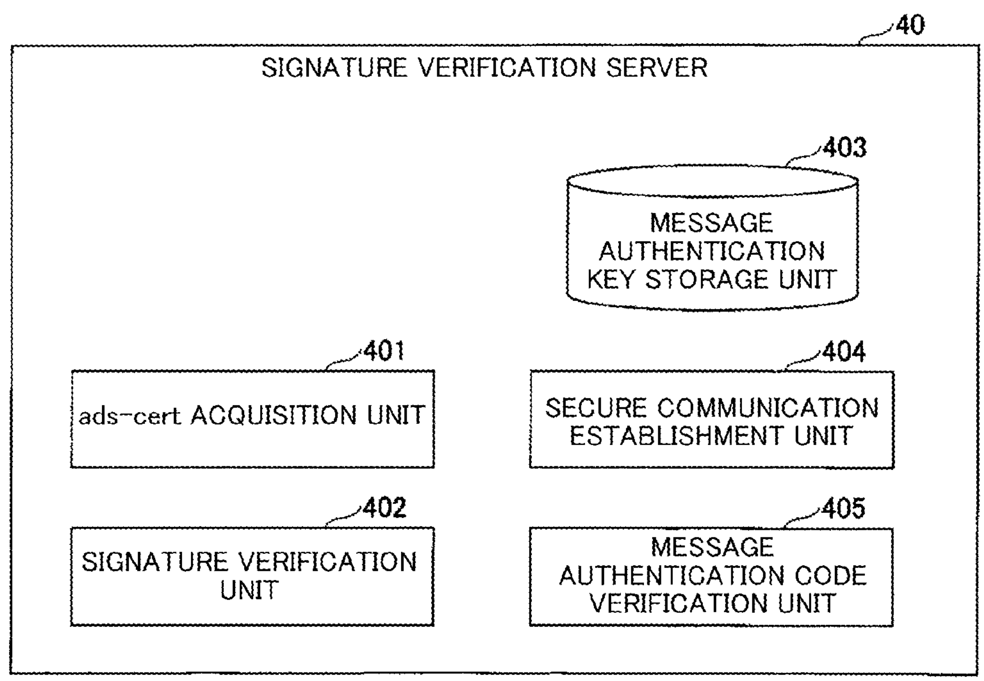
FIG. 3 is a diagram showing an example of the functional configuration of a signature verification server according to Example 1.

FIG. 3 is a diagram showing an example of the functional configuration of the signature verification server 40 in Example 1. As shown in FIG. 3, the signature verification server 40 in Example 1 has an ads-cert acquisition unit 401 and a signature verification unit 402.

Upon receiving a bid request from the bid server 30, the ads-cert acquisition unit 401 transmits a given ads-cert file name and a given publisher domain name included in the bid request to the verification key management server 50, and acquires the latest ads-cert file (i.e., a valid verification key) for the publisher from the verification key management server 50. Note that as described later, the verification key management server 50 verifies the ads-cert file name and the publisher domain name transmitted by the signature verification server 40. Then, if an ads-cert file corresponding to the ads-cert file name and the publisher domain name exists, and a version of the ads-cert file is the latest, the verification key management server 50 transmits the ads-cert file to the signature verification server 40. Accordingly, the signature verification server 40 can obtain a valid verification key.

The signature verification unit 402 verifies the signature of the bid request with use of the verification key acquired from the verification key management server 50.

As described above, the ads-cert file is transmitted by the verification key management server 50 to the signature verification server 40. Thus, in order to prevent tempering of the verification key (ads-cert file), a secure channel is established in advance between the signature verification server 40 and the verification key management server 50, and the ads-cert file is transmitted using the secure channel. Thus, as shown in FIG. 3, the signature verification server 40 in Example 1 has a message authentication key storage unit 403, a secure communication establishment unit 404, and a message authentication code verification unit 405.

The message authentication key storage unit 403 stores a key $K_2$ that is shared with the verification key management server 50.

The secure communication establishment unit 404 executes a key sharing protocol with the verification key management server 50 to generate a key $K_2$, and stores the key $K_2$ in the message authentication key storage unit 403. Note that it is preferable that the secure communication establishment unit 404 regenerates the key $K_2$ every time a predetermined time elapses by re-executing the key sharing protocol with the verification key management server 50.

The message authentication code verification unit 405 verifies the message authentication code transmitted by the verification key management server 50 together with the ads-cert file. This therefore makes it possible to check whether the ads-cert file has been tampered with.

<<Verification Key Management Server 50>>

Figure 4:
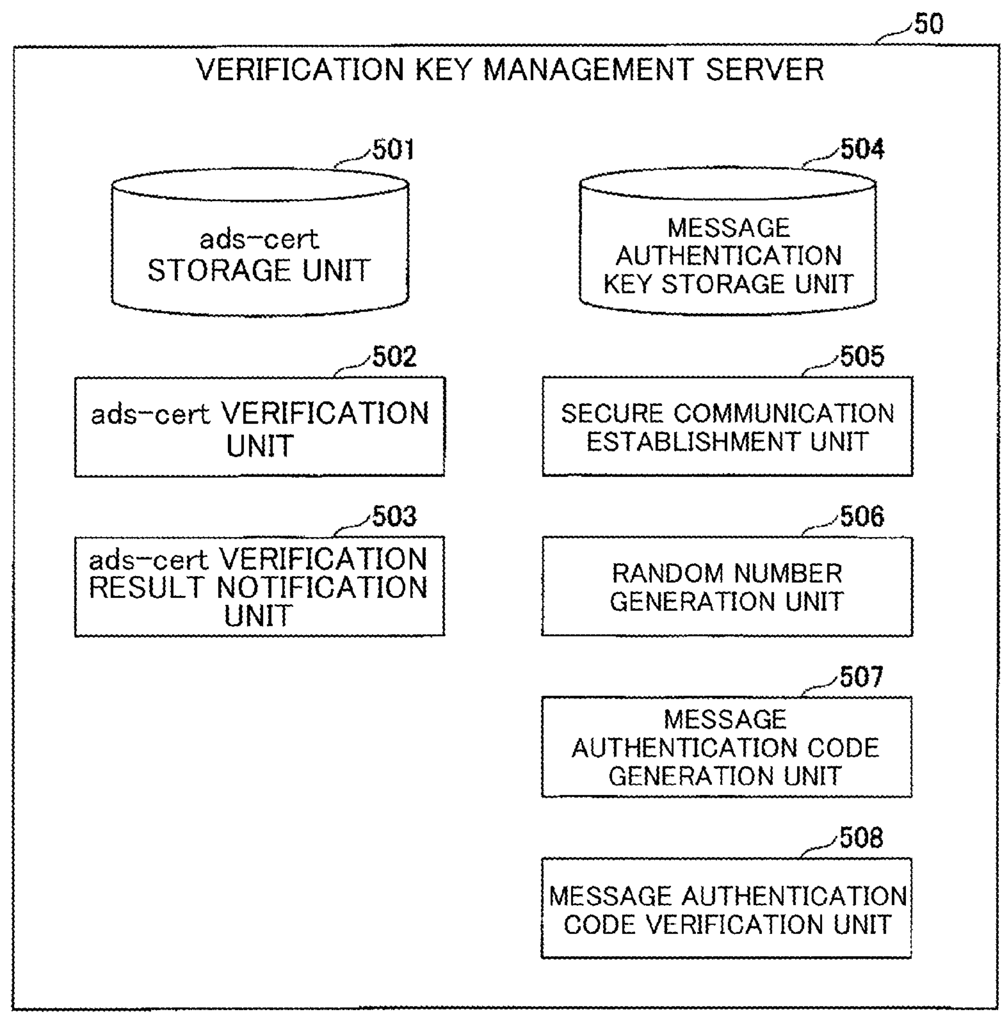
FIG. 4 is a diagram showing an example of the functional configuration of a verification key management server according to Example 1.

FIG. 4 is a diagram showing an example of the functional configuration of the verification key management server 50 in Example 1. As shown in FIG. 4, the verification key management server 50 in Example 1 has an ads-cert storage unit 501, an ads-cert verification unit 502, and an ads-cert verification result notification unit 503.

The ads-cert storage unit 501 stores an ads-cert file transmitted by the signature generation server 20, in association with a publisher domain name. Specifically, the ads-cert file transmitted by the key version notification unit 202 of the signature generation server 20 is stored in the ads-cert storage unit 501, in association with the publisher domain name. At this time, in order to manage the generation of the ads-cert file, a time stamp indicating a time at which the verification key management server 50 receives the ads-cert file from the signature generation server 20 is also stored in the ads-cert storage unit 501, in association with the ads-cert file. However, there is no limitation to using a time stamp, and any information can be used as long as the information can identify the latest version of the ads-cert file.

Note that the bid request generation server 10 is assumed to store information for allowing identification of the latest version of the ads-cert file.

The ads-cert verification unit 502 verifies the following two conditions, using the ads-cert file name and the publisher domain name that were transmitted by the signature verification server 40. A first condition is with respect to whether there is an ads-cert file of a publisher that corresponds to the publisher domain name and has the same file name as the ads-cert file name. A second condition is a condition in which if the ads-cert file exists, it is whether it is the latest. Note that whether the ads-cert file is the latest version may be verified based on, for example, the time stamp stored in association with the ads-cert file. Note that because the ads-cert file is in the "ads-cert.version.txt" format as described above, the latest version may be specified based the "version" included in the file name.

If the latest version of the ads-cert file of the publisher exists (i.e., if a valid verification key exists), the ads-cert verification result notification unit 503 transmits the ads-cert file to the signature verification server 40. In contrast, if a valid verification key does not exist, the ads-cert verification result notification unit 503 transmits, to the signature verification server 40, a notification indicating that the ads-cert file name is not authentic.

As described above, the verification key management server 50 stores the ads-cert file transmitted by the signature generation server 20, in the ads-cert storage unit 501, and transmits the ads-cert file to the signature verification server 40 in accordance with the result of the verification performed by the ads-cert verification unit 502. Thus, in order to prevent tempering of the verification key (ads-cert file), as described above, it is preferable that a secure channel is established in advance between the signature generation server 20 and the verification key management server 50 and between the signature verification server 40 and the verification key management server 50, and that the ads-cert file is transmitted using the secure channel. In such a manner, as shown in FIG. 4, the verification key management server 50 in Example 1 includes a message authentication key storage unit 504, a secure communication establishment unit 505, a random number generation unit 506, a message authentication code generation unit 507, and a message authentication code verification unit 508.

The message authentication key storage unit 504 stores the key $K_1$ that is shared with the signature generation server 20 and the key $K_2$ that is shared with the signature verification server 40.

The secure communication establishment unit 505 executes a key sharing protocol with the signature generation server 20 to generate the key $K_1$, and stores the key $K_1$ in the message authentication key storage unit 504. Also, the secure communication establishment unit 505 executes a key sharing protocol with the signature verification server 40 to generate the key $K_2$, and stores the key $K_2$ in the message authentication key storage unit 504. Note that it is preferable that the secure communication establishment unit 505 regenerates the keys $K_1$ and $K_2$ every time a predetermined time elapses by re-executing the key sharing protocol with the signature generation server 20 and the signature verification server 40.

The random number generation unit 506 generates a random number r used for generating the message authentication code.

When an ads-cert file is to be transmitted to the signature verification server 40, the message authentication code generation unit 507 uses the key $K_2$ to generate a message authentication code for a message that is obtained by combining the random number r and the ads-cert file.

The message authentication code verification unit 508 verifies the message authentication code transmitted by the signature generation server 20 together with the ads-cert file. This therefore makes it possible to check whether the ads-cert file has been tampered with.

<Key Information Registration>

Figure 5:
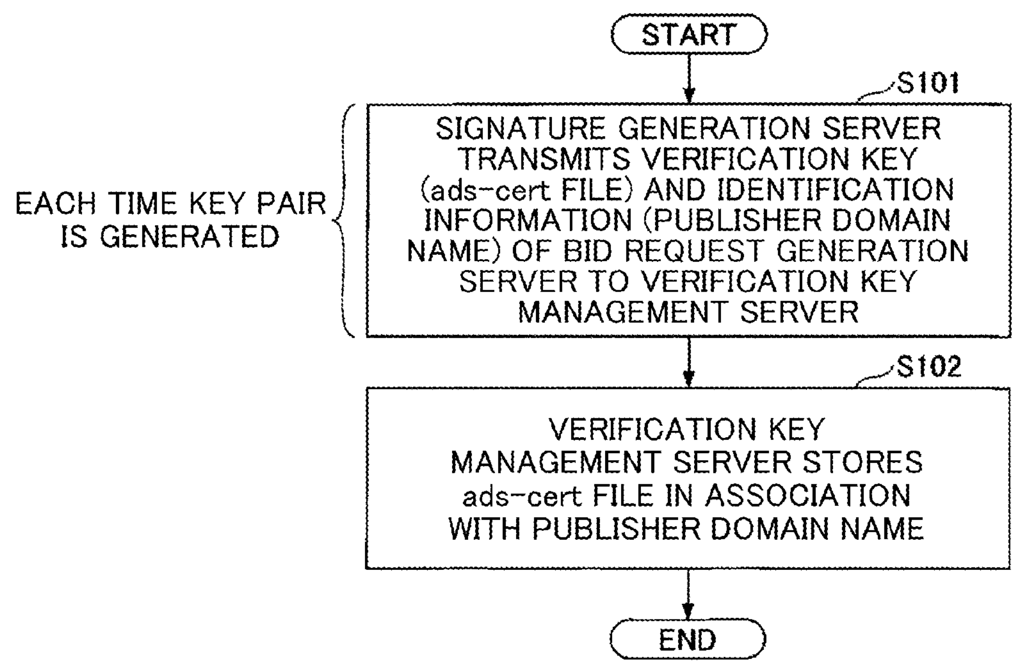
FIG. 5 is a diagram for describing a flow of registering key information according to Example 1.

In Example 1, a flow of a process of registering a verification key in the verification key management server 50 (key information registration), without using a secure channel, will be described with reference to FIG. 5. FIG. 5 is a diagram for describing the flow of registering key information in Example 1. Note that in FIG. 5, a key pair (signing key and verification key) is generated by the bid request generation server 10 or the signature generation server 20, and the key pair is stored in the key pair storage unit 201 in association with the publisher domain name of the publisher that manages the bid request generation server 10.

Each time a key pair is generated, the key version notification unit 202 of the signature generation server 20 transmits the verification key (ads-cert file) and the publisher domain name that corresponds to the verification key to the verification key management server 50 (step S101).

Upon receiving the ads-cert file and the publisher domain name from the signature generation server 20, the verification key management server 50 stores the ads-cert file, the publisher domain name, and a time stamp in association with each other in the ads-cert storage unit 501 (step S102). Accordingly, the verification key management server 50 manages generations of verification keys (ads-cert files) for each publisher.

<Bid Request Generation and Signing>

Figure 6:
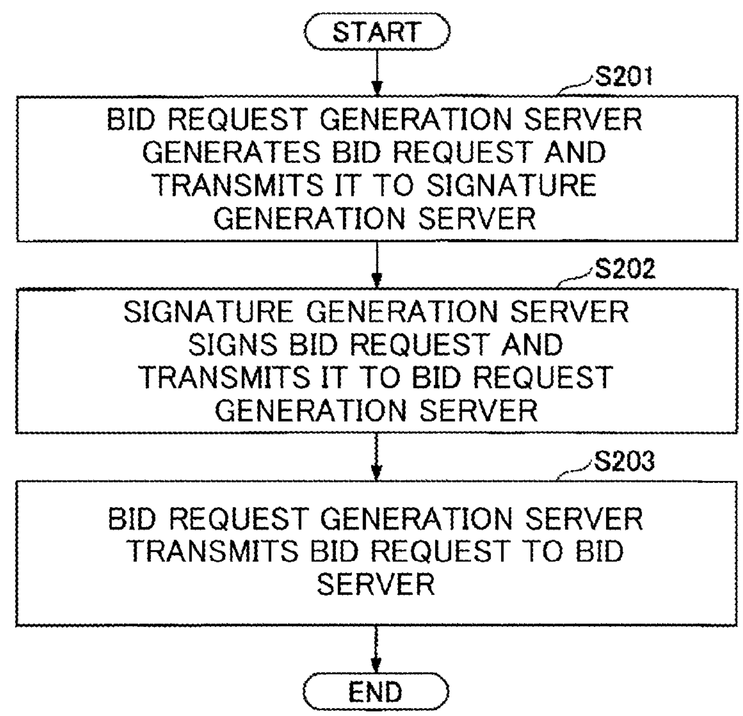
FIG. 6 is a diagram for describing a flow of generating a bid request and signing according to Example 1.

A flow set in a case where a bid request is generated and signed (bid request generation and signing) and then is transmitted to the bid server 30 in Example 1 will be described with reference to FIG. 6. FIG. 6 is a diagram for describing the flow of generating the bid request and signing in Example 1.

The bid request generation server 10 generates a bid request and transmits the bid request to the signature generation server 20 (step S201). Specifically, the bid request generation server 10 generates a bid request by, for example, inputting the publisher domain name, the IP address of the accessing user, and the like, in respective target signature fields, as described in "3.2.1 SIGNATURE DIGEST FIELDS" in Non-Patent Document 2. Note that in this description, the name of the ads-cert file used for signing/verification is also input to the cert field, and this input may be performed by the bid request generation server 10 or the signature generation server 20. In the following, the explanation will be provided assuming that the ads-cert file name is input to the cert field during the bid request.

The signature generation unit 203 of the signature generation server 20 retrieves, from the key pair storage unit 201, the signing key corresponding to the ads-cert file name included in the bid request. The signature generation unit 203 of the signature generation server 20 then signs signature digest fields in the bid request with the signing key, inputs the generated signature to the digest field in the bid request, and then transmits the bid request to the bid request generation server 10 (step S202).

Then, the bid request generation server 10 transmits the bid request received from the signature generation server 20 to the bid server 30 (step S203). Thus, the bid request signed with the publisher's signing key is transmitted to the bid server 30.

<Ads-Cert Verification and Bid Request Verification>

Figure 7:
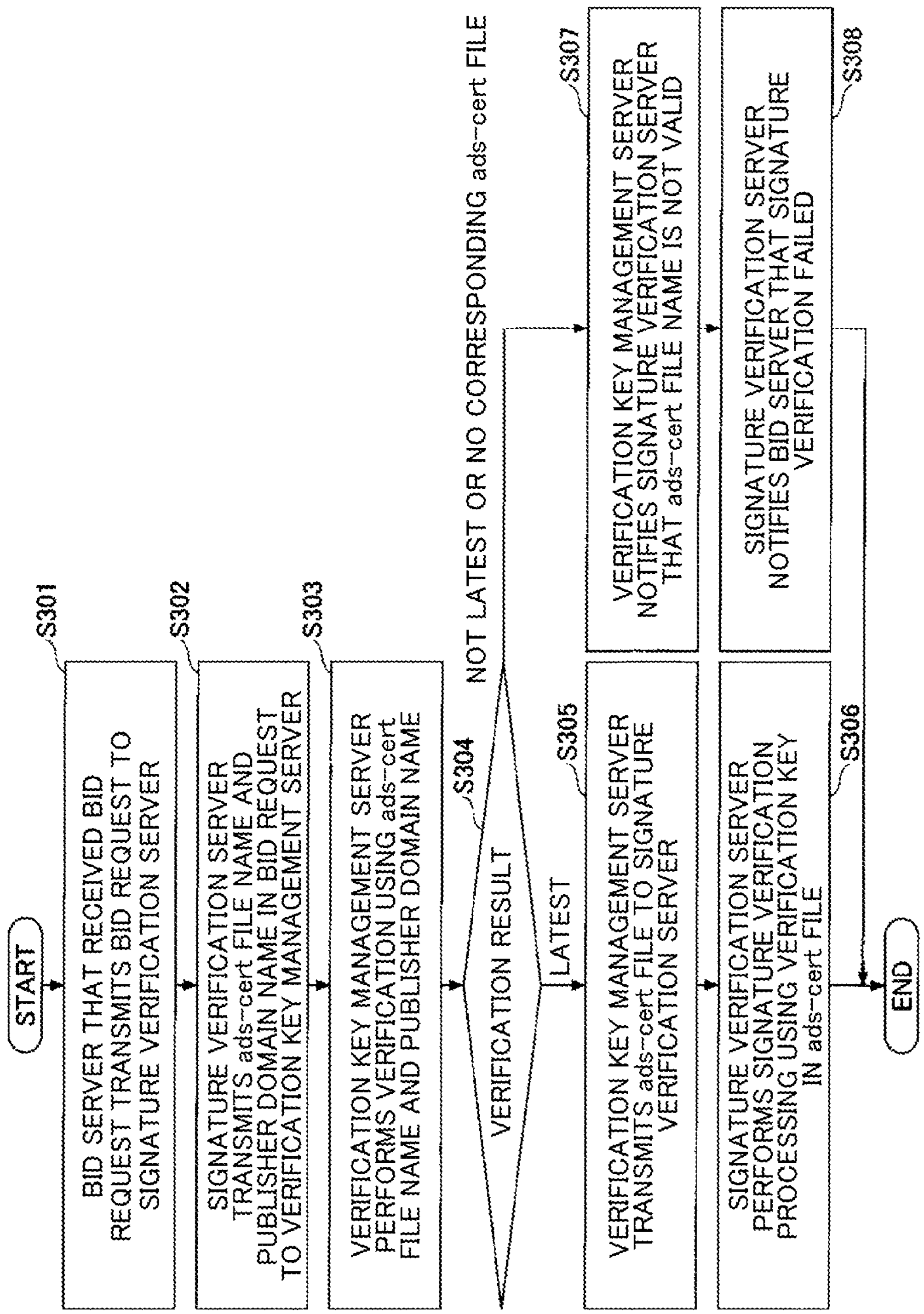
FIG. 7 is a diagram for describing a flow of verifying ads-cert and verifying a bid request according to Example 1.

Hereinafter, a flow of a process of verifying the authenticity of an ads-cert file name included in a bid request and signing the bid request (ads-cert verification and bid request verification), without considering a secure channel in Example 1, will be described with reference to FIG. 7. FIG. 7 is a diagram for describing the flow of verifying the ads-cert and verifying the bid request in Example 1.

The bid server 30 transmits a bid request received from the bid request generation server 10 to the signature verification server 40 (step S301).

The ads-cert acquisition unit 401 of the signature verification server 40 transmits the ads-cert file name and the publisher domain name that are included in the bid request to the verification key management server 50 (step S302).

The ads-cert verification unit 502 of the verification key management server 50 uses the ads-cert file name and the publisher domain name that were transmitted by the signature verification server 40 to verify whether or not there is an ads-cert file of a publisher that corresponds to the publisher domain name and has the same file name as the ads-cert file name, and if such a file exists, whether or not that ads-cert file is the latest version (step S303).

If there is an ads-cert file of a publisher that corresponds to the publisher domain name and has the same file name as the ads-cert file name ("latest" in step S304), the ads-cert verification result notification unit 503 of the verification key management server 50 transmits that ads-cert file to the signature verification server 40 (step S305). Thus, the signature verification unit 402 of the signature verification server 40 can use the verification key included in the ads-cert file (i.e., a valid verification key) to perform signature verification processing for verifying the signature of the bid request (step S306). The result obtained in the signature verification process is transmitted to the bid server 30. Note that in signature verification processing, the signature verification is performed using the verification key included in the ads-cert file, the signature digest fields in the bid request, and the digest field.

In contrast, if there is no ads-cert file of a publisher that corresponds to the publisher domain name and has the same file name as the ads-cert file name, or even if such a file exists, if it is not the latest version ("not latest or no corresponding ads-cert file" in step S304), the ads-cert verification result notification unit 503 of the verification key management server 50 transmits, to the signature verification server 40, a notification indicating that the ads-cert file name is invalid (step S307). The signature verification unit 402 of the signature verification server 40 then transmits, to the bid server 30, a notification indicating that signature verification for the bid request has failed (step S308).

<Key Information Registration (after Establishment of Secure Channel)>

Figure 8:
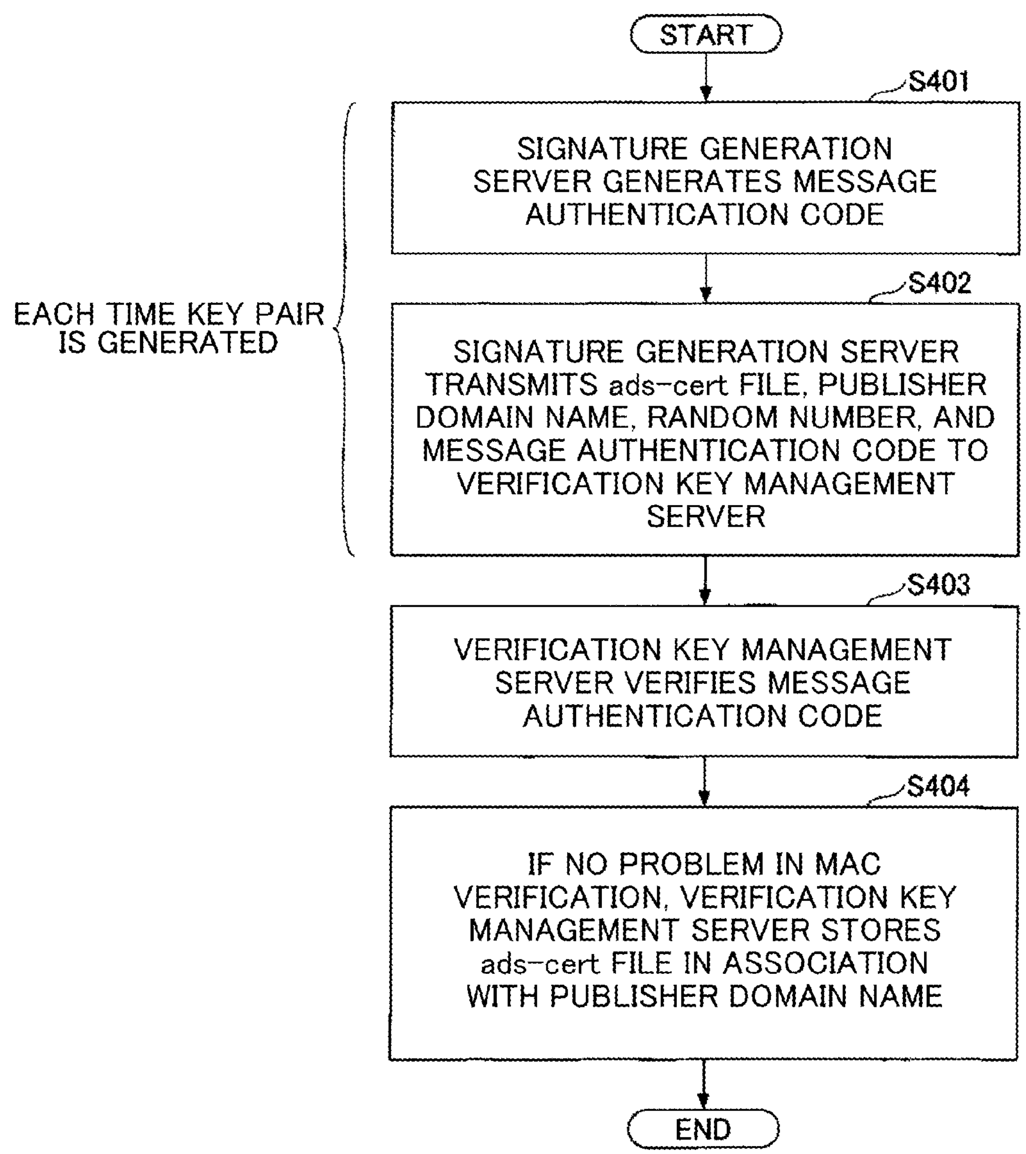
FIG. 8 is a diagram for describing a flow of registering key information (after establishment of a secure channel) according to Example 1.

Next, a flow set in a case where key information registration is performed after establishment of a secure channel in Example 1 will be described with reference to FIG. 8. FIG. 8 is a diagram for describing the flow of registering key information (after establishment of a secure channel) according to Example 1. Note that a secure channel is established by the secure communication establishment unit 205 of the signature generation server 20 and the secure communication establishment unit 505 of the verification key management server 50 executing a key sharing protocol to generate the key $K_1$. The key sharing protocol is executed at a timing different from the timing of key information registration, and at least once prior to key information registration. Further, as in FIG. 5, in FIG. 8, a key pair (signing key and verification key) is generated by the bid request generation server 10 or the signature generation server 20, and the key pair is stored in the key pair storage unit 201, in association with the publisher domain name of the publisher that manages the bid request generation server 10.

Each time a key pair is generated, the message authentication code generation unit 207 of the signature generation server 20 generates a message authentication code (step S401). Here, the random number r is generated in advance by the random number generation unit 206, and the key $K_1$ stored in the message authentication key storage unit 204 is used to generate a message authentication code for a message obtained by a combination of the random number r, the ads-cert file, and the publisher domain name. An example of a hash function used for generating the message authentication code includes HMAC-SHA256. However, it is not limited to the example described above, and any hash function can be adopted.

Note that because the random number r is a value for preventing a replay attack, it may be a time stamp for the time when step S401 is executed, for example.

Next, the key version notification unit 202 of the signature generation server 20 transmits the ads-cert file, the publisher domain name, and the random number r and the message authentication code that were generated in step S401 to the verification key management server 50 (step S402).

The message authentication code verification unit 508 of the verification key management server 50 verifies the message authentication code transmitted by the signature generation server 20 with use of the key $K_1$ stored in the message authentication key storage unit 504 (step S403). Specifically, the message authentication code verification unit 508 uses the key $K_1$ stored in the message authentication key storage unit 504 to generate a message authentication code for a message that is obtained by combining the random number r, the ads-cert file, and the publisher domain name that were transmitted by the signature generation server 20. The message authentication code verification unit 508 then verifies whether or not the message authentication code and the message authentication code transmitted by the signature generation server 20 match.

If the result of the verification (MAC verification) in step S403 above indicates that any problem does not arise, the verification key management server 50 stores the ads-cert file, the publisher domain name, and a time stamp in association with each other in the ads-cert storage unit 501 (step S404). Accordingly, for each publisher, the verification key management server 50 can manage generations of ads-cert files (verification keys) that have been verified to have not been tampered with. Note that if the result of the MAC verification in step S403 above indicates that there is a problem, the verification key management server 50 may transmit a notification indicating that the MAC verification failed to the signature generation server 20.

<Ads-Cert Verification and Bid Request Verification (after Establishment of Secure Channel)>

Figure 9:
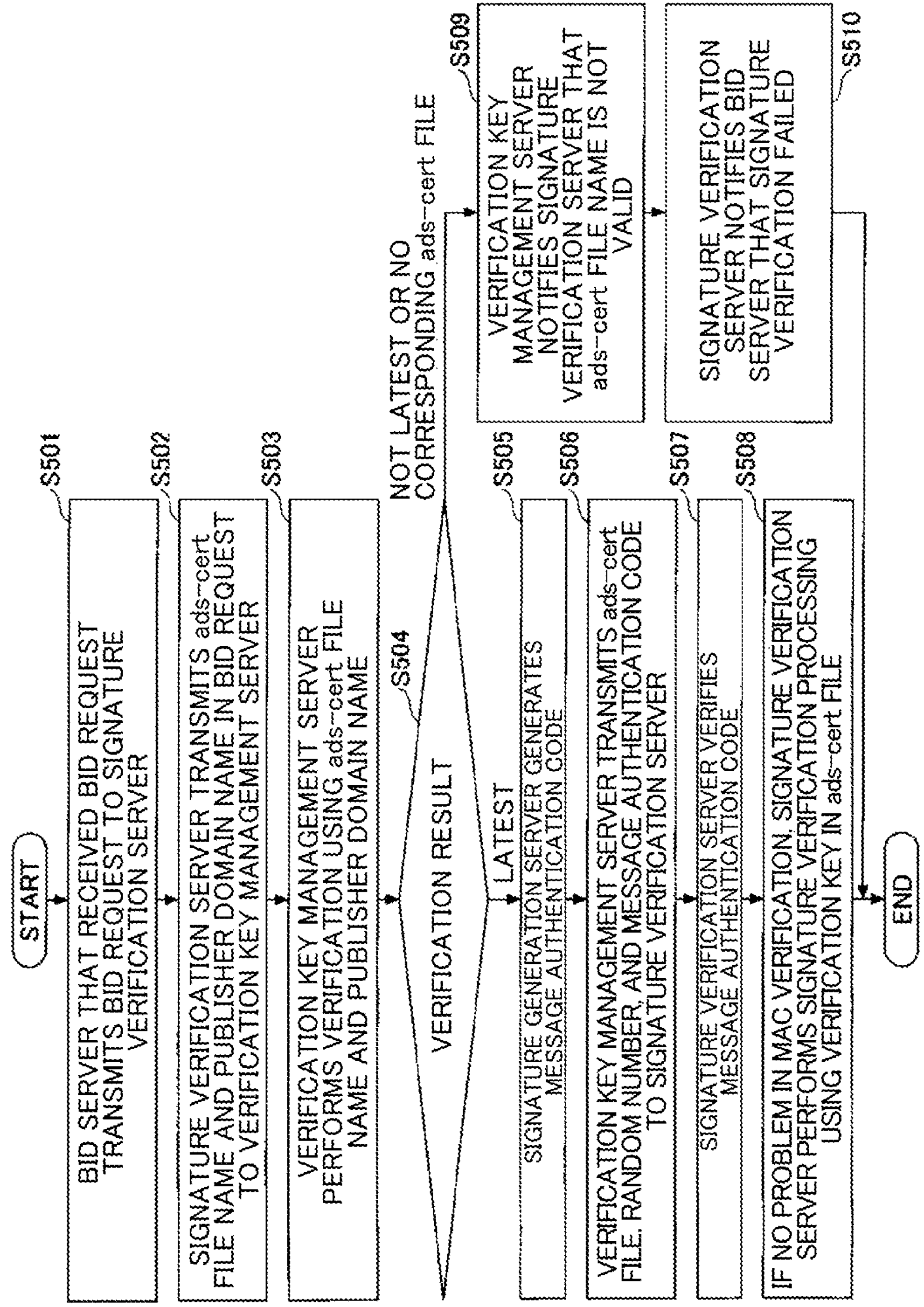
FIG. 9 is a diagram for describing a flow of verifying ads-cert and verifying a bid request (after establishment of the secure channel) according to Example 1.

Next, a flow of verifying ads-cert and verifying bid request, after establishment of a secure channel in Example 1, will be described with reference to FIG. 9. FIG. 9 is a diagram for describing the flow of verifying the ads-cert and verifying the bid request (after establishment of a secure channel) in Example 1. Note that a secure channel is established by the secure communication establishment unit 404 of the signature verification server 40 and the secure communication establishment unit 505 of the verification key management server 50 executing the key sharing protocol to generate the key $K_2$. The key sharing protocol is executed at a timing different from the timing of ads-cert verification and bid request verification, and at least once prior to ads-cert verification and bid request verification.

Steps S501 to S504 in FIG. 9 are similar steps S301 to S304 in FIG. 7 and the description thereof will not be provided below.

If the result is "latest" in step S504, the message authentication code generation unit 507 of the verification key management server 50 generates a message authentication code (step S505). Here, the random number r is generated in advance by the random number generation unit 506, and the key $K_2$ stored in the message authentication key storage unit 504 is used to generate a message authentication code for a message obtained by combining the random number r and the ads-cert file that is to be transmitted to the signature verification server 40.

Next, the ads-cert verification result notification unit 503 of the verification key management server 50 transmits, to the signature verification server 40, the ads-cert file along with the message authentication code and the random number r generated in step S505 (step S506).

The message authentication code verification unit 405 of the signature verification server 40 verifies the message authentication code transmitted by the verification key management server 50 with use of the key $K_2$ stored in the message authentication key storage unit 403 (step S507). Specifically, the message authentication code verification unit 405 uses the key $K_2$ stored in the message authentication key storage unit 403 to generate a message authentication code for a message that is obtained by combining the random number r and the ads-cert file that were transmitted by the verification key management server 50. The message authentication code verification unit 405 then verifies whether or not the message authentication code and the message authentication code transmitted by the verification key management server 50 match.

If the result of the verification (MAC verification) in step S507 above indicates that there is no problem, the signature verification unit 402 of the signature verification server 40 performs signature verification processing for verifying the signature of the bid request (step S508) with use of the verification key included in the ads-cert file (i.e., valid verification key). Thus, the signature verification server 40 can verify the signature of the bid request, with use of an ads-cert file (verification key) that has been verified to have not been tampered with.

In contrast, if the result is "not latest or no corresponding ads-cert file" in step S504, steps S509 to S510 are executed. Steps S509 to S510 are similar to steps S307 to S308 in FIG. 7 and the description thereof will not be provided.

Example 2

Hereinafter, Example 2 will be described. Note that the configuration of the signature verification system 1 in Example 2 may be the same as that in Example 1. In Example 2, the bid request generation server 10 and the signature generation server 20 are not required to be included in the signature verification system 1, for example.

<Functional Configuration>

The functional configuration of the signature generation server 20, the signature verification server 40, and the verification key management server 50 in Example 2 will be described. Note that the functional configuration of the signature generation server 20 is similar to that in Example 1 and the description thereof will not be provided.

Note that in Example 2, key information registration (FIG. 5) may be performed as in Example 1, or key information registration may be omitted. Also, for example, key information registration is performed only once or several times at the beginning, and thereafter key information may not be registered.

<<Signature Verification Server 40>>

Figure 10:
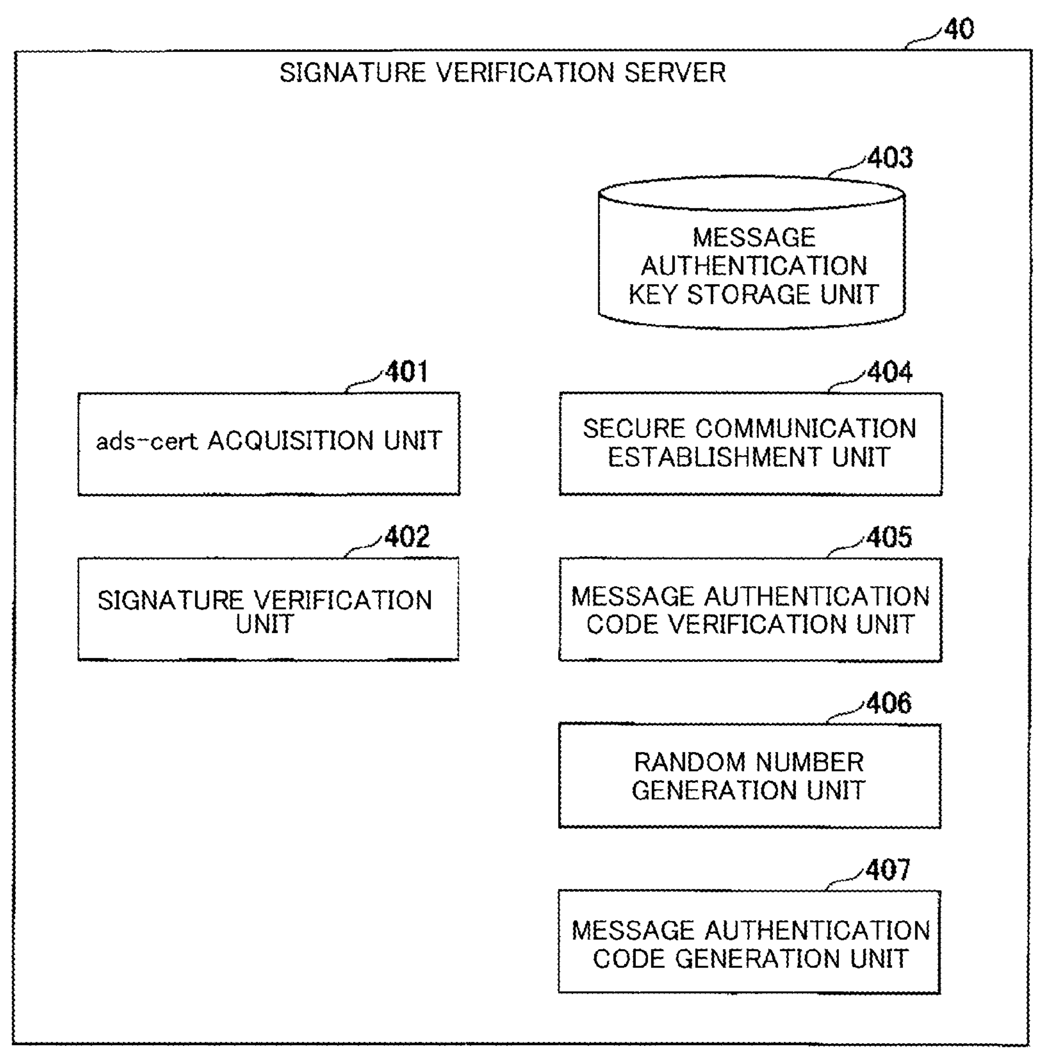
FIG. 10 is a diagram showing an example of the functional configuration of a signature verification server according to Example 2.

FIG. 10 is a diagram showing an example of the functional configuration of the signature verification server 40 in Example 2. As shown in FIG. 0, the signature verification server 40 in Example 2 has the functional configuration described in Example 1, and further includes a random number generation unit 406 and a message authentication code generation unit 407.

The random number generation unit 406 generates the random number r used for generating a message authentication code.

In transmitting an ads-cert file name and a publisher domain name to the verification key management server 50, the message authentication code generation unit 407 uses the key $K_2$ to generate a message authentication code for a message that is obtained by combining the random number r, the publisher domain name, and the ads-cert file name.

<<Verification Key Management Server 50>>

Figure 11:
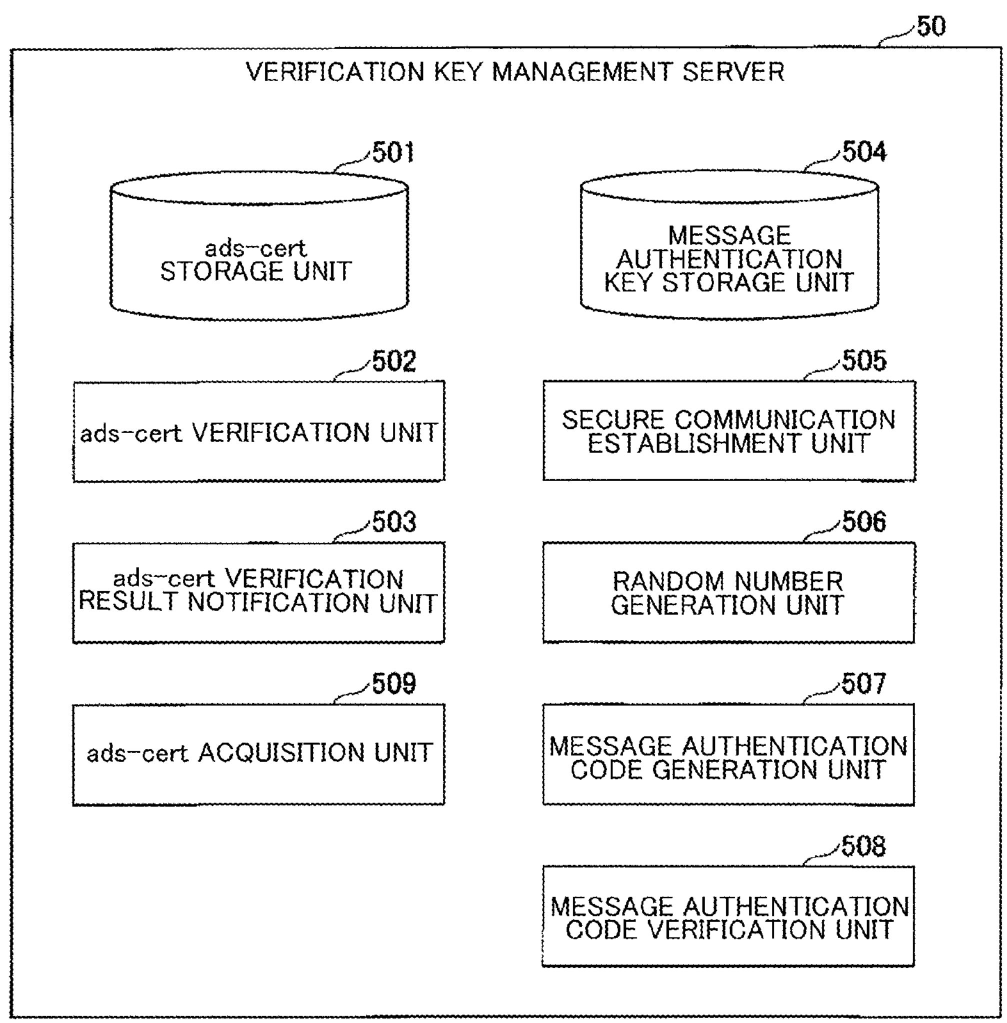
FIG. 11 is a diagram showing an example of the functional configuration of a verification key management server according to Example 2.

FIG. 11 is a diagram showing an example of the functional configuration of the verification key management server in Example 2. As shown in FIG. 11, the verification key management server 50 in Example 2 has the functional configuration described in Example 1 and further includes an ads-cert acquisition unit 509.

If the verification result obtained by the ads-cert verification unit 502 indicates that "no ads-cert file corresponding to ads-cert file name transmitted by signature verification server 40", the ads-cert acquisition unit 509 acquires the ads-cert file that has the same name directly under the root domain of the publisher, and stores the ads-cert file in the ads-cert storage unit 501, in association with the publisher domain name of the publisher.

<Ads-Cert Verification and Bid Request Verification>

Figure 12:
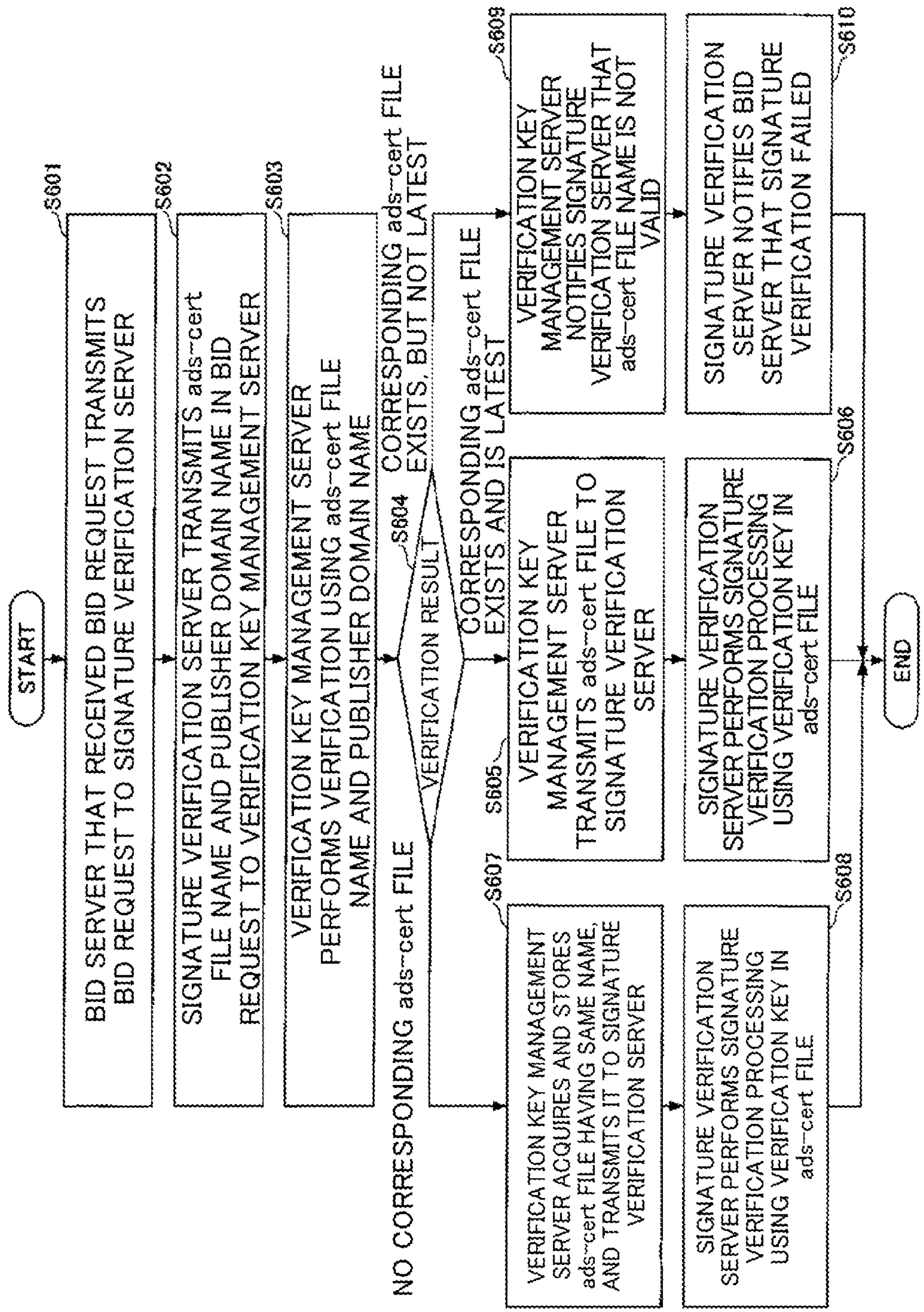
FIG. 12 is a diagram for describing a flow of verifying the ads-cert and verifying the bid request according to Example 2.

Next, a flow of a process of verifying the ads-cert and verifying the bid request, without using a secure channel in Example 2, will be described with reference to FIG. 12. FIG. 12 is a diagram for describing the flow of verifying the ads-cert and verifying the bid request in Example 2.

Steps S601 to S603 of FIG. 12 are similar to steps S301 to S303 of FIG. 7 and the description thereof will not be provided.

If the result is "corresponding ads-cert file exists and is latest" in step S604, the ads-cert verification result notification unit 503 of the verification key management server 50 transmits the ads-cert file to the signature verification server 40 (step S605). Accordingly, the signature verification unit 402 of the signature verification server 40 can perform signature verification processing for verifying the signature of the bid request (step S606) with use of the verification key described in the ads-cert file (i.e., a valid verification key).

In contrast, if the result is "no corresponding ads-cert file" in step S604, the ads-cert acquisition unit 509 of the verification key management server 50 acquires the ads-cert file that has the same name as the ads-cert file name transmitted by the signature verification server 40 from directly under the root domain of the publisher (i.e., the publisher that corresponds to the publisher domain name transmitted by the signature verification server 40). The ads-cert acquisition unit 509 then stores the ads-cert file in the ads-cert storage unit 501 and also transmits it to the signature verification server 40 (step S607). Note that when the ads-cert file is stored in the ads-cert storage unit 501, the ads-cert file is stored in association with the publisher domain name and a time stamp. Accordingly, the signature verification unit 402 of the signature verification server 40 can perform signature verification processing for verifying the signature of the bid request with use of the verification key included in the ads-cert file (step S608).

In contrast, if the result is "corresponding ads-cert file exists but is not latest" in step S604, steps S609 to S610 are executed. Steps S609 to S610 are similar to steps S307 to S308 of FIG. 7 and the description thereof will not be provided.

<Ads-Cert Verification and Bid Request Verification (after Establishment of Secure Channel)>

Figure 13:
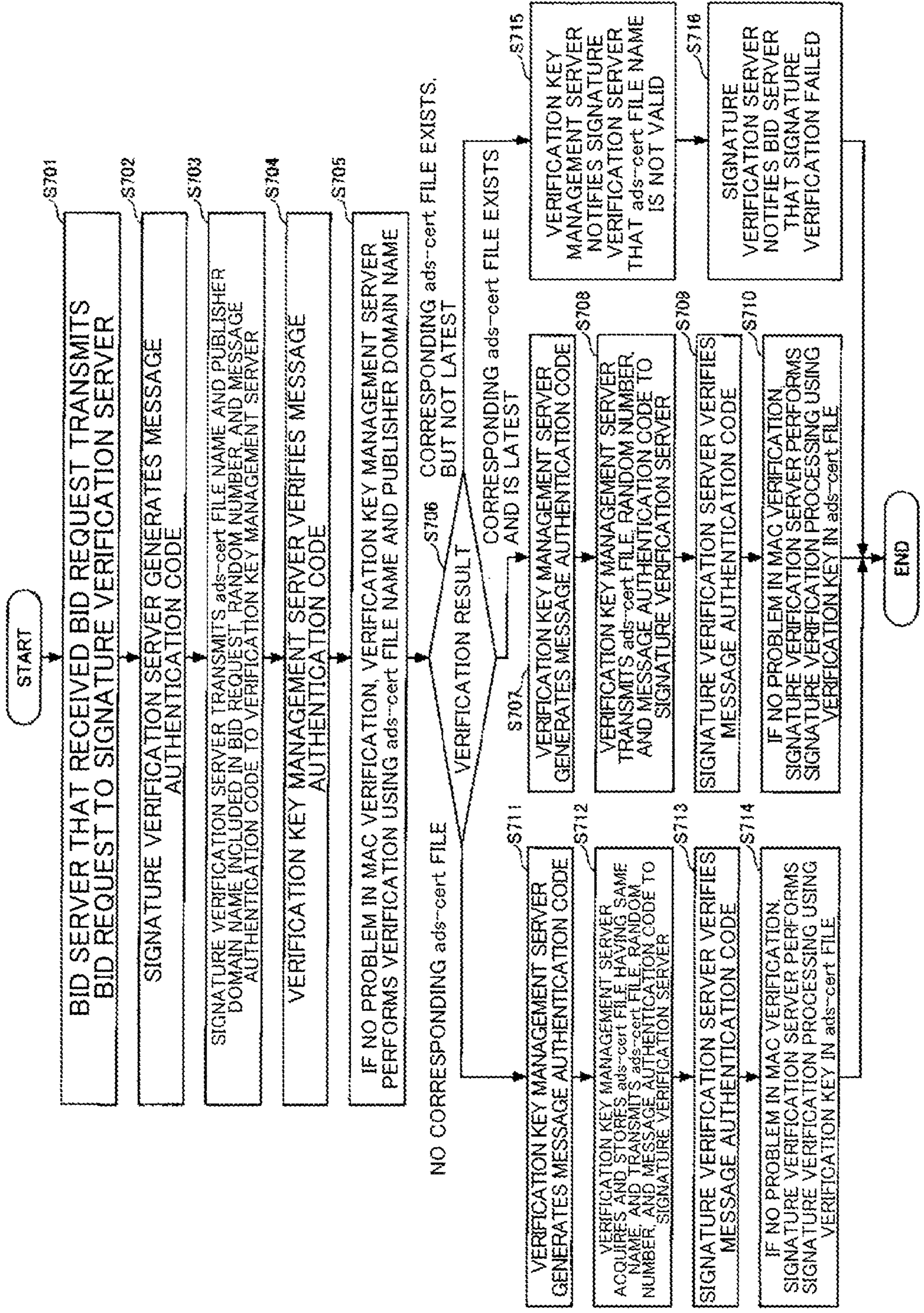
FIG. 13 is a diagram for describing a flow of verifying the ads-cert and verifying the bid request (after establishment of a secure channel) according to Example 2.

Next, a flow of verifying the ads-cert and verifying the bid request, after establishment of a secure channel in Example 2, will be described with reference to FIG. 13. FIG. 13 is a diagram for describing the flow of verifying the ads-cert and verifying the bid request (after establishment of a secure channel) in Example 2. Note that a secure channel is established by the secure communication establishment unit 404 of the signature verification server 40 and the secure communication establishment unit 505 of the verification key management server 50 executing the key sharing protocol to generate the key $K_2$. The key sharing protocol is executed at a timing different from the timing of ads-cert verification and bid request verification, and at least once prior to ads-cert verification and bid request verification.

First, the bid server 30 transmits a bid request received from the bid request generation server 10 to the signature verification server 40 (step S701).

The message authentication code generation unit 407 of the signature verification server 40 generates a message authentication code (step S702). In this case, a random number $r_1$ is generated in advance by the random number generation unit 406 (or the time stamp at the time when this step is executed may be used), and the key $K_2$ stored in the message authentication key storage unit 403 is used to generate a message authentication code for a message obtained by combining the random number $r_1$ and the ads-cert file name and the publisher domain name that are to be transmitted to the verification key management server 50.

Next, the ads-cert acquisition unit 401 of the signature verification server 40 transmits, to the verification key management server 50, the ads-cert file name, the publisher domain name, and the random number $r_1$ and the message authentication code that were generated in step S702 (step S703).

The message authentication code verification unit 508 of the verification key management server 50 verifies the message authentication code transmitted by the signature verification server 40 with use of the key $K_2$ stored in the message authentication key storage unit 504 (step S704). Specifically, the message authentication code verification unit 508 uses the key $K_2$ stored in the message authentication key storage unit 504 to generate a message authentication code for a combination of the random number $r_1$, the ads-cert file name, and the publisher domain name that were transmitted by the signature verification server 40. The message authentication code verification unit 508 then verifies whether or not the message authentication code and the message authentication code transmitted by the signature verification server 40 match.

If the result of the verification (MAC verification) in step S704 indicates that there is no problem, the ads-cert verification unit 502 of the verification key management server 50 performs verification similar to that in step S303 in FIG. 7 (step S705).

If the result is "corresponding ads-cert file exists and is latest" in step S706, the message authentication code generation unit 507 of the verification key management server 50 generates a message authentication code (step S707). Here, a random number $r_2$ is generated in advance by the random number generation unit 506, and the key $K_2$ stored in the message authentication key storage unit 504 is used to generate a message authentication code for a message obtained by combining the random number $r_2$ and the ads-cert file name that is to be transmitted to the signature verification server 40. Note that the previously-described random number $r_1$ may be used as the random number $r_2$.

Next, the ads-cert verification result notification unit 503 of the verification key management server 50 transmits the ads-cert file, the random number $r_2$ generated in step S707, and the message authentication code to the signature verification server 40 (step S708). Note that if the random number $r_1$ is used in step S707, the ads-cert verification result notification unit 503 does not need to send the random number $r_1$ to the signature verification server 40.

The message authentication code verification unit 405 of the signature verification server 40 verifies the message authentication code transmitted by the verification key management server 50 with use of the key $K_2$ stored in the message authentication key storage unit 403 (step S709). Specifically, the message authentication code verification unit 405 uses the key $K_2$ stored in the message authentication key storage unit 403 to generate a message authentication code for a message that is obtained by combining the random number $r_2$ transmitted by the verification key management server 50 (or the random number $r_1$ if the random number $r_1$ was used in step S706) and the ads-cert file. The message authentication code verification unit 405 then verifies whether or not the message authentication code and the message authentication code transmitted by the verification key management server 50 match.

If the result of the verification (MAC verification) in step S709 indicates that there is no problem, the signature verification unit 402 of the signature verification server 40 performs signature verification processing for verifying the signature of the bid request (step S710) with use of the verification key included in the ads-cert file (i.e., a valid verification key).

In contrast, if the result is "no corresponding ads-cert file" in step S706, the message authentication code generation unit 507 of the verification key management server 50 generates a message authentication code similarly to step S707 (step S711).

Next, the ads-cert acquisition unit 509 of the verification key management server 50 acquires the ads-cert file that has the same name as the ads-cert file name transmitted by the signature verification server 40 from directly under the root domain of the publisher (i.e., the publisher that corresponds to the publisher domain name transmitted by the signature verification server 40), and stores the ads-cert file in the ads-cert storage unit 501. The ads-cert acquisition unit 509 transmits the ads-cert file, the random number $r_2$, and the message authentication code to the signature verification server 40 (step S712). At this time, if the random number $r_1$ was used in the step S711, the ads-cert acquisition unit 509 does not need to send the random number $r_1$ to the signature verification server 40. Note that when the ads-cert file is stored in the ads-cert storage unit 501, the ads-cert file is stored in association with the publisher domain name and a time stamp.

The message authentication code verification unit 405 of the signature verification server 40 verifies the message authentication code transmitted by the verification key management server 50 similarly to step S709 (step S713).

If the result of the verification (MAC verification) in step S713 above indicates that there is no problem, the signature verification unit 402 of the signature verification server 40 performs signature verification processing for verifying the signature of the bid request with use of the verification key included in the ads-cert file (step S714).

In contrast, if the result is "not latest or no corresponding ads-cert" in step S706, steps S715 to S716 are executed. Steps S715 to S716 are similar to steps S307 to S308 of FIG. 7 and therefore will not be described.

<Hardware Configuration>

Figure 14:
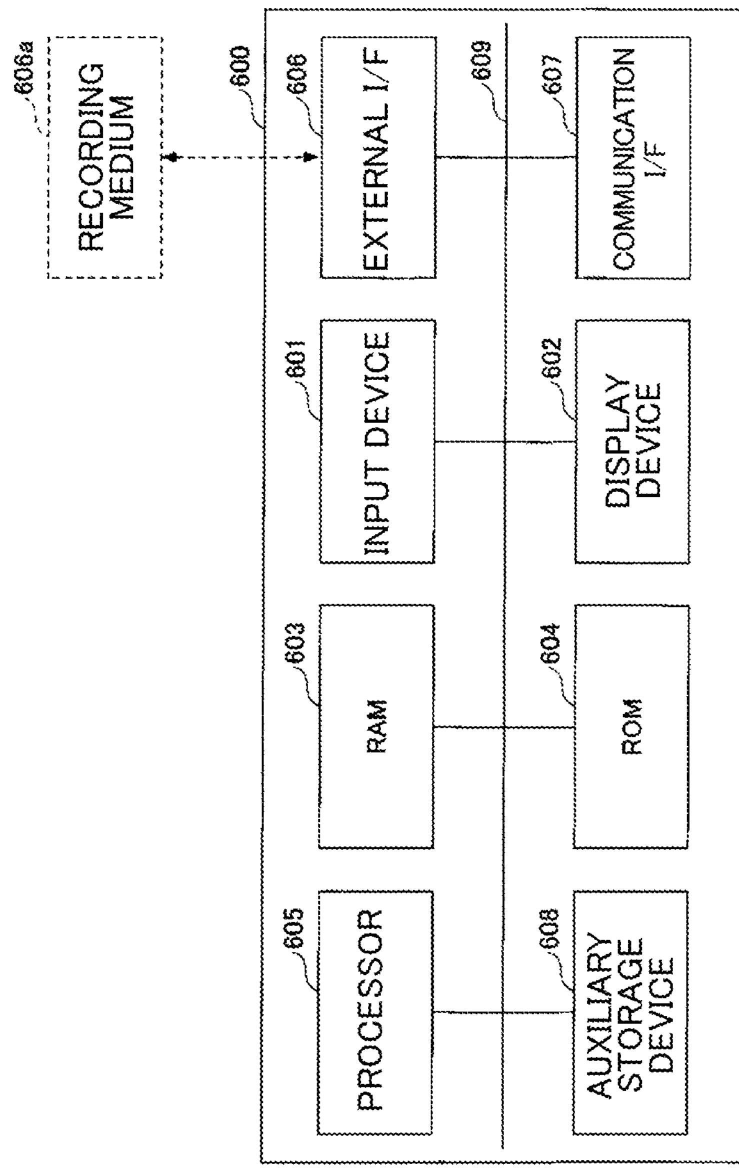
FIG. 14 is a diagram showing an example of a hardware configuration of a computer.

A hardware configuration of a computer that is implemented by servers (the bid request generation server 10, the signature generation server 20, the bid server 30, the signature verification server 40, and the verification key management server 50), which are included in the signature verification system 1 according to the present embodiment, will be described. FIG. 14 is a diagram showing an example of the hardware configuration of a computer 600.

The computer 600 shown in FIG. 14 includes an input device 601, a display device 602, a RAM (Random Access Memory) 603, a ROM (Read Only Memory) 604, a processor 605, an external I/F 606, a communication I/F 607, and an auxiliary storage device 608. These hardware components are communicably coupled to one another via a bus 609.

The input device 601 is a keyboard, a mouse, a touch panel, or the like. The display device 602 is a display or the like. Note that the servers included in the signature verification system 1 according to the present embodiment may be configured without at least one of the input device 601 and the display device 602.

The RAM 603 is a volatile semiconductor memory that temporarily holds programs and data. The ROM 604 is a non-volatile semiconductor memory that can retain programs and data even when the power is turned off. The processor 605 is an arithmetic unit such as a CPU (Central Processing Unit).

The external I/F 606 is an interface for communication with an external device such as a recording medium 606*a*. The recording medium 606*a* is an external recording medium such as a CD, a DVD, or an SD memory card. The communication I/F 607 is an interface for communication with a communication network N.

The auxiliary storage device 608 is an HDD (Hard Disk Drive), an SSD (Solid State Drive), or the like.

The servers included in the signature verification system 1 according to the present embodiment can perform various types of processing described above, by the hardware configuration of the computer 600 shown in FIG. 14. Specifically, functional units of the signature generation server 20, functional units of the signature verification server 40, and functional units of the verification key management server 50 according to the present embodiment are each implemented by the processor 605 that executes one or more programs stored in the auxiliary storage device 608 or the like. Further, storage units of the signature generation server 20, storage units of the signature verification server 40, and storage units of the verification key management server 50 according to the present embodiment are each implemented by the RAM 603, the auxiliary storage device 608, or the like, for example.

Note that the servers included in the signature verification system 1 according to the present embodiment may be realized by using one or more computers 600. Also, the computer 600 may include a plurality of processors 606 and a plurality of memories (e.g., the RAM 603, the ROM 604, the auxiliary storage device 608, or the like).

The present invention is not limited to the above embodiment that is described in detail, and various changes and modifications can be made without departing from the scope of the claims.

REFERENCE SIGNS LIST

1 Signature verification system
10 Bid request generation server
20 Signature generation server
30 Bid server
40 Signature verification server
50 Verification key management server
201 Key pair storage unit
202 Key version notification unit
203 Signature generation unit
204 Message authentication key storage unit
205 Secure communication establishment unit
206 Random number generation unit
207 Message authentication code generation unit
401 ads-cert acquisition unit
402 Signature verification unit
403 Message authentication key storage unit
404 Secure communication establishment unit
405 Message authentication code verification unit
406 Random number generation unit
407 Message authentication code generation unit
501 ads-cert storage unit
502 ads-cert verification unit
503 ads-cert verification result notification unit
504 Message authentication key storage unit
505 Secure communication establishment unit
506 Random number generation unit
507 Message authentication code generation unit
508 Message authentication code verification unit
509 ads-cert acquisition unit
N Communication network

The invention claimed is:

1. A signature verification system comprising:

a signature generation server including first circuitry configured to generate a signing key and a verification key by a publisher, the verification key being a part of an encryption key pair of a bid request, wherein the bid request describes a request by the publisher for receiving a bid on a region for placing a content, indicate, to a verification key management server, the verification key and publisher identification information for identifying the publisher, and sign the bid request issued by the publisher, with use of the generated signing key, the verification key management server including a storage and second circuitry electrically coupled to the storage, the second circuitry being configured to resister the indicated publisher identification information and verification key in the storage, the publisher identification information and the verification key are associated with information that enables a version of the verification key to be identified, receive the publisher identification information and the version indicating a verification key, from the signature verification server, in response to receiving the publisher identification information and the version of the verification key, determining whether a verification key of a latest version, that correspond to the received publisher identification information and version, is registered in the storage unit, and transmit, upon determining that the verification key of the latest version is registered in the storage, the verification key of the latest version to a signature verification server, the signature verification server being electrically configured to be coupled to the signature generation server and a signature verification server, and the signature verification server including third circuitry configured to receive the bid request, transmit, in response to receiving the bid request, publisher identification information and the version indicating a verification key that are included in the received bid request, to the verification key management server, and verify a signature for the bid request by using the verification key of the latest version, upon occurrence of a condition in which the verification key management server sends, to the signature verification server, the verification key of the latest version based on the publisher identification information and version transmitted from the third circuitry of the signature verification server.

2. The signature verification system according to claim 1, wherein the first circuitry of the signature generation server is configured to indicate, to the verification key management server, the publisher identification information and the verification key by using a secure channel that is preliminarily established with the verification key management server, and the second circuitry of the verification key management server is configured to transmit, the verification key of the latest version to the signature verification server, by using a secure channel that is preliminarily established with the signature verification server.

3. The signature verification system according to claim 1, wherein the second circuitry of the verification key management server is further configured to acquire, upon determining the verification key of the latest version is not registered in the storage, a verification key located directly under a root domain associated with the publisher corresponding to the publisher identification information, and register, in the storage, the acquired verification key associated with the publisher identification information and information that enables a version of the acquired verification key to be identified.

4. A verification key management apparatus to be electrically coupled, via a communication network, to a signature verification server for verifying a signature of in a bid request, the verification key management apparatus comprising:

a storage; and circuitry electrically coupled to the storage, the circuitry being configured to receive, publisher identification information of the publisher and a verification key of the bid request, wherein the bid request describes a request by the publisher for receiving a bid on a region for placing a content, resister, in the storage, the publisher identification information and the verification key, the publisher identification information being for identifying the publisher of the bid request, the verification key being a part of an encryption key pair of the bid request, and the verification key being used to verify the signature of the publisher, and the publisher identification information and the verification key corresponding to a version of the verification key, receive the publisher identification information of the publisher and a version of the verification key, determine, in response to receiving the publisher identification information and the verification key, whether a verification key of a latest version, corresponding to the received publisher identification information and version, is registered in the storage unit, and transmit the verification key of the latest version to the signature verification server, upon determining that the verification key of the latest version is registered in the storage.

5. A verification key management method for execution by a computer to be electrically coupled, via a communication network, to a signature verification server that verifies a signature of a bid request, the verification key management method comprising:

receiving publisher identification information of the publisher and a verification key of the bid request, wherein the bid request describes a request by the publisher for receiving a bid on a region for placing a content;

registering, in a storage, the publisher identification information and the verification key, the publisher identification information being for identifying the publisher of the bid request, the verification key being a part of an encryption key pair of the bid request, the verification key being used to verify the signature of the publisher, and the received publisher identification information and verification key corresponding to a version of the received verification key;

receiving, from the signature verification server, the publisher identification information of the publisher and an identifier of the verification key of the bid request;

determining, in response to receiving the publisher identification information and the version of the verification key, whether the received publisher identification information corresponds to the registered publisher identification information in the storage and whether the received version of the verification key of the bid request corresponds the latest version of the registered verification key in the storage; and transmitting, upon determining that that the verification key of the latest version is registered in the storage, the verification key of the latest version to the signature verification server.

6. A non-transitory recording medium storing program that causes a computer to execute the verification key management method according to claim 5.

* * * * *